United States Patent [19]

Yang

[11] Patent Number: 5,461,264
[45] Date of Patent: Oct. 24, 1995

[54] MULTI-VOLTAGE CONTROL CIRCUIT OF BATTERY OR MULTIPLE INDEPENDENT DC POWER

[76] Inventor: Tai-Her Yang, 5-1 Taipin St., Si-Hu Town, Dzan-Hwa, Taiwan

[21] Appl. No.: 346,357

[22] Filed: Nov. 29, 1994

Related U.S. Application Data

[63] Continuation of Ser. No. 963,449, Oct. 19, 1992, abandoned.

[51] Int. Cl.[6] .................................................. H02J 1/00
[52] U.S. Cl. .................................. 307/81; 307/63; 307/77
[58] Field of Search ............................... 307/43, 54, 61, 307/63, 77, 80, 81, 85; 323/283; 363/65, 71

[56] References Cited

U.S. PATENT DOCUMENTS

| | | | |
|---|---|---|---|
| 4,175,249 | 11/1979 | Gruber | 323/15 |
| 4,412,137 | 10/1983 | Hansen et al. | 307/10 R |
| 4,788,452 | 11/1988 | Stanley | 307/71 |
| 4,814,631 | 3/1989 | Jackson | 307/53 |
| 5,045,990 | 9/1991 | Stanley | 363/43 |
| 5,121,046 | 6/1992 | McCullough | 320/16 |
| 5,352,931 | 10/1994 | Yang | 307/81 |

FOREIGN PATENT DOCUMENTS 197239  7/1965  Sweden .................................. 307/71

Primary Examiner—Peter S. Wong
Assistant Examiner—Adolf Berhane
Attorney, Agent, or Firm—Leonard Bloom

[57] ABSTRACT

A power unit includes a plurality of substantially identical battery units connected in series and/or in parallel by respective switches. Said switches are actuated by a central control unit in accordance with requirements of a load. A solid switch member provides linearization and PM modulation at the graded output voltage in order to attain a low-ripple output voltage. Said graded DC output voltage can be further converted into AC output.

1 Claim, 16 Drawing Sheets

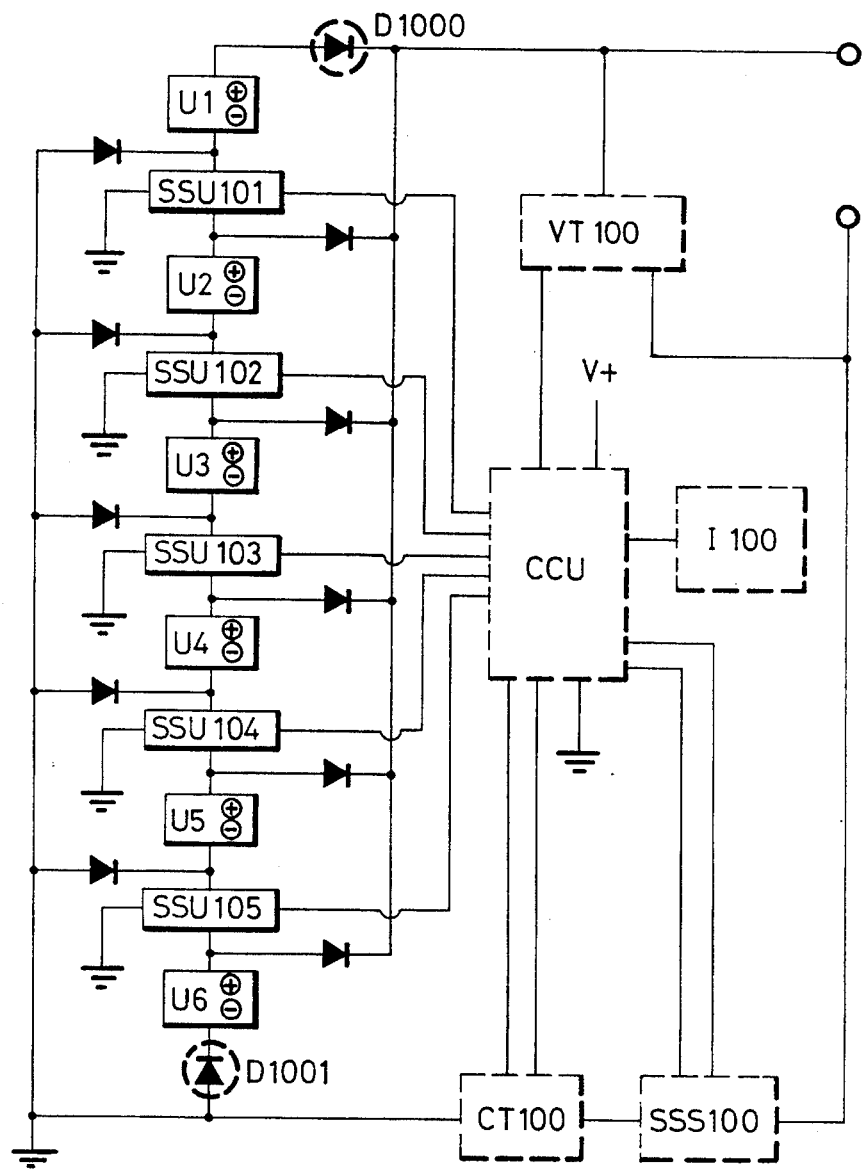
FIG. 6
FIG. 7
FIG. 8

| | SSS100 | SW500 | SW501 | SW502 | SW503 | SW504 | SW505 |
|---|---|---|---|---|---|---|---|
| H | | ON | ON | ON | OFF | OFF | ON |
| M↔H | ON | ON | ON | ON | OFF | OFF | OFF |
| M | ON | ON | OFF | ON | OFF | OFF | ON |
| L↔M | ON | ON | OFF | ON | OFF | OFF | OFF |
| L | ON | ON | | | ON | | |
| 0↔L | ON | OFF | OFF | OFF | ON | ON | |

MULTI-VOLTAGE CONTROL CIRCUIT OF BATTERY OR MULTIPLE INDEPENDENT DC POWER

This application is a continuation of application Ser. No. 07/963,449, filed Oct. 19, 1992, now abandoned.

FIELD OF THE INVENTION

The present invention relates to power sources, and more particularly, to power sources with the output adjustable to requirements of a load.

BACKGROUND OF THE INVENTION

Since batteries are portable and mobile, they are widely used for various kinds of appliances, such as electric vehicles, etc. Although there are different types of batteries, including fuel, thermal, sun-power batteries, they all have a basic feature, i.e. voltage. It would be highly desirable to have a power unit which would have a graded output voltage of desired wave shape, i.e. linear, PWM or chopped.

SUMMARY OF THE INVENTION

Therefore the object of the present invention is to provide an independent power unit with output compatible with any equipment to be powered. The output voltage and capacity of the power unit is chosen by means of connection battery units in series and/or parallel and supplied in accordance with the need of a load. The graded output voltage is linearized, chopped, and PW modulated, if needed. This is an efficient power unit mainly to provide a multi-output graded voltage, of desired shape, and to attain a non-sparkle switching between graded output voltages and low ripple-wave output voltage. According to the teaching of the present invention, a power unit includes a plurality of battery units which are connected by a plurality of switches. A central control unit controls state of each switch to connect said battery units in series and/or in parallel to each other. The output voltage thereby can be graded and take the following values: EB, 2EB, 3EB, etc., wherein EB is a standard voltage of each battery unit (please note that all battery units are substantially identical). Thus obtained graded output voltage is further linearizes, chopped or pulse-width modulated by a solid state switch member to obtain low-ripple output voltage.

A plurality of diodes are connected to respective switches and battery units to prevent back feed of current. The solid state switch member provides a linear voltage adjustment of graded output voltage or chopped wave voltage adjustment of graded output voltage. It can provide a high quality graded output voltage and a low-ripple transition between an output voltages with different values. The advantages of the power unit of the present invention also include a reduced heat dissipation and high efficiency.

BRIEF DESCRIPTION OF THE DRAWINGS

FIG. 6 is a view of a power unit of FIG. 1 which employs a plurality of solid state switches.

FIG. 7 is a timing diagrams of linearized graded output voltage (3 values of the graded output voltage are shown).

FIG. 8 is a timing diagram of chopped graded output voltage (3 values of the graded output voltage are shown).

FIG. 29 is a chart of sequence of on/off states of respective switches according to the present invention.

DETAILED DESCRIPTION OF THE INVENTION

Figure 1:
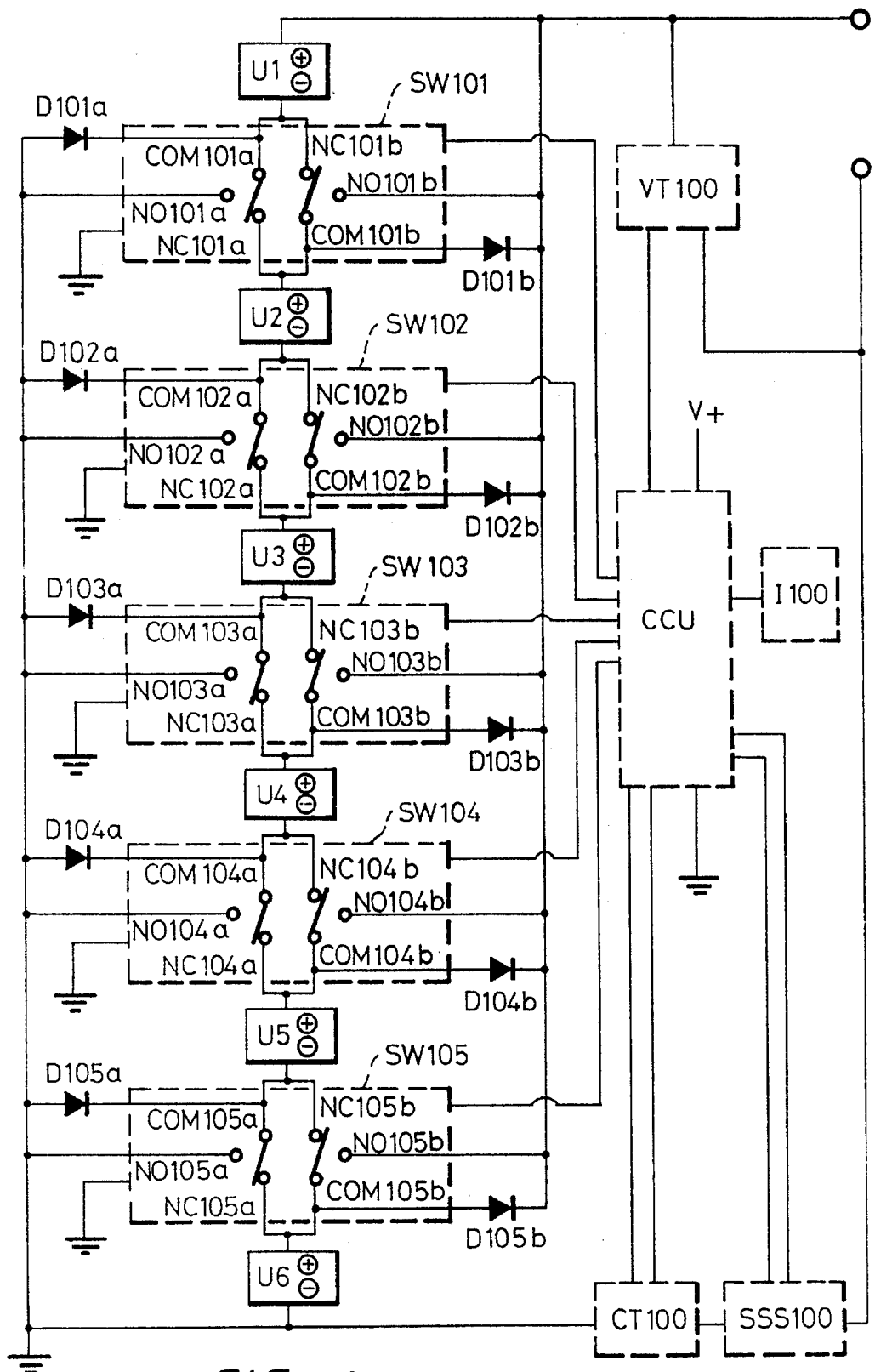
FIG. 1 is a view of a power unit according to one embodiment of the present invention.

Referring to FIG. 1 one of embodiments of a Power Unit of the present invention includes a plurality of substantially identifies battery units ($U_1$–$U_6$) connected by two-throw (c) contact switch as (SW101–SW105). An output voltage (Vo) of the power unit depends on type of connections between said battery units ($U_1$–$U_6$), number of battery units ($U_1$/$U_6$) contributing into Vo, and state of switches (SW101–SW105). A plurality of diodes (D101a–D105a, D1016–D1056) are employed to eliminate said diodes' direct voltage reducing and thermal loss. A current and voltage inspection device (CT100, VT100), solid state switch member (SSS100), and a central processing unit (CCU) are included to control switches (SW101–SW105), the solid state switch member (SSS100) for adjusting the output voltage Vo (or current flow) to predetermine a required output current or voltage value. An output device (I100) sets limitations for output voltage and current and sets an operational order for CCU. The solid state switch member SSS100 provides a pulse width modulation (PWM) of the graded output voltage Vo. The output voltage Vo is also linearized to provide a low ripple output voltage.

The battery ($U_1$/$U_6$) are substantially identical batteries, and can include linear or quadratic storage batteries, sun-power batteries, fuel batteries, thermal batteries, etc. Switches (SW101–SW105) can include two-pole manual two-throw switches, or drum switches, or electro-mechanical switch members, such as magnetic or mechanically operated relay, etc., which are connected between battery units ($U_1$/$U_6$) and tend to be in direct polarity with respective battery units. Each switch includes a pair of common contacts (COM101a, 1016–COM105a,1056), a pair of normally closed contacts (NC101a, 101b–NC105a, 101b), and a pair of normally opened contacts (N101a, 101b–NO105a, 105B). In each switch (SW101–SW105) the first common contact (COM101a–COM105a) is connected to the second normally close contact. Each closed contact (NC101b–NC105b), and the second common contact (Com101b–COM 105b) is connected to the first normally closed contact (NC101a–NC105a). The switches are connected between the respective battery units ($U_1$/$U_6$) such that the negative terminal of each battery unit ($U_1$/$U_6$) is connected to both the first common contact (COM101a–COM 1a) and the second normally opened contact (No101b–No105b) of the switches (SW101–SW105), respectively, and the positive terminal of another battery unit is connected to both the (NO101a–NO105a) and the (COM101b–COM105b). When the respective switches (SW101–SW105) are actuated by the central control unit (CCU), the respective common contacts are connected to respective normally opened contacts or to respective normally closed contacts. This provides serial and/or parallel connection between respective battery units.

Said power unit provides the following function and advantages:

1. Multiple choice for output voltages.

2. When the power unit outputs an output voltage, contacts of respective diodes, are tended to close so that they can eliminate direct pressure drop and thermal loss of diode.

3. Diodes are used as transient current path to prolong the life of switch contact.

4. Switches of the power unit of the present invention be further selected as a two-phase conductive member or inverse-phase device in order to provide for control over the input voltage and current, or in situation when the power unit is inversely input from the output end, and for control over solid state switch member (if there is one) in order to fit the situation of external input power.

Referring again to FIG. 1, the power unit includes switches SW101–SW105 between six battery units U1–U6; each switch has diodes D101a–105a, and D101b–105b. When common contact and close contact of operating switch SW101–105 are tended to close, all battery units are connected in series with output voltage Vo=6×EB (EB is a voltage supplied by each battery unit). When in SW102 and SW104 common contacts are connected with open contacts, the output voltage Vo will be 2×EB; that is, every two battery units are serialized and then multiplied. When in switches SW101–SW105 common contacts are connected with open contacts, the output voltage Vo will be EB; that is, battery unit U1–U6 are multiplied. If we use 24 battery units, we can get multi-voltage grades of 1×EB, 2×EB, 3×EB, 4×EB, 6×EB, 8×EB, 12×EB, 24×EB. If we use 36 battery units the output voltage Vo which will take values of, we can get 1×Eb, 2×EB, 3×Eb, 4×EB, 6×EB, 9×EB, 12×EB, 18×EB, 36×EB. It will be appreciated by these skilled in the art that any number of battery units can be employed in the power unit of the present invention. Said power unit can be controlled manually, or can be controlled by a central control unit (CCU) and input unit I100; or to further employ the open solid state switch member SSS 100 at the output terminal so as to adjust and control the electro-mechanical switches operation and solid state switches operation which depends on input value.

Figure 2:
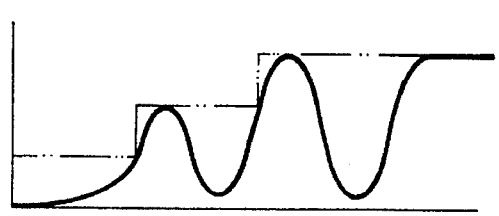
FIG. 2 is a timing diagram of a linearized graded output voltage.
Figure 3:
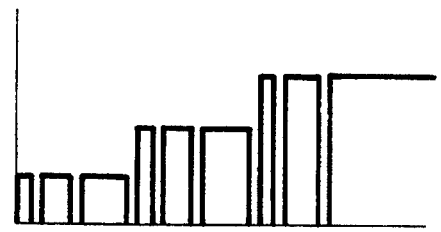
FIG. 3 is a timing diagram of a chopped graded output voltage.

Controlling process is going on as follows:

directly by means of linear solid state switch member, trim the output of graded voltage by controlling electro-mechanical switches. Make the output voltage higher than the needed output voltage value, and then use the central control unit (CCU) to control the drive current of linear solid state switch member SSS100 so as to get the linear adjustment of the output voltage. Referring to FIG. 2, if we want to adjust output voltage which is higher than a battery units voltage EB, we can do it by means of electro-mechanical switches. The heat dissipation will be reduced.

directly by switching the solid state switch member, SSS100 trim the output voltage by controlling electro-mechanical switches. Make the output higher than the needed output value, and then use the central controlling unit (CCU) to control the drive pulse range of switched solid state switch member SSS100 so as to get the average output voltage. Referring to FIG. 3, if we want to adjust output voltage higher than battery units voltage EB, we can do it by means of electro-mechanical switches. The ripple-wave value thereby will be reduced.

We can further employ an inspection device CT100 connected to the output battery unit in order to inspect its output current value and for feeding back to the central controlling unit (CCU) connected to output terminals of the power unit in order to inspect the output voltage and to feed back to the central controlling unit CCU. According to the input unit instruction or the preset value of required voltage or required current in the OCU, and also according to VT100 and CT100, the electro-mechanical mechanical switches and solid state switch member are controlled and an inspection device VT100. In addition to adjusting the voltage change caused by unsteady load, (or altered requirements), it is possible to adjust voltage alterations caused by unsteady power voltage, that can take place where a voltage drops in a battery unit because of storage is reduced, or when voltage is unsteady in a sun-power battery unit because of sunlight energy is changed.

One of the most important advantages of the power unit of the present invention is that it is possible to achieve a non-sparkle switching (on/off) of electro-mechanical switches because of difference in changeover time (or in contact time) of the electro-mechanical switches and the solid state switch member. This switch further provides a non-sparkle switching of positive and negative poles of the electro-mechanical switches. When switching on an electro-mechanical switch, the solid state switch member is suspended in "on" state, longer than the electro-mechanical switch, when switching off the electro-mechanical switch, the solid-switch member precedes the electro-mechanical switch to cut off the voltage. According to said switch operation order, the switch may be locked up or delayed by manual, electro-magnetic, mechanic, and hydro control.

Figure 4:
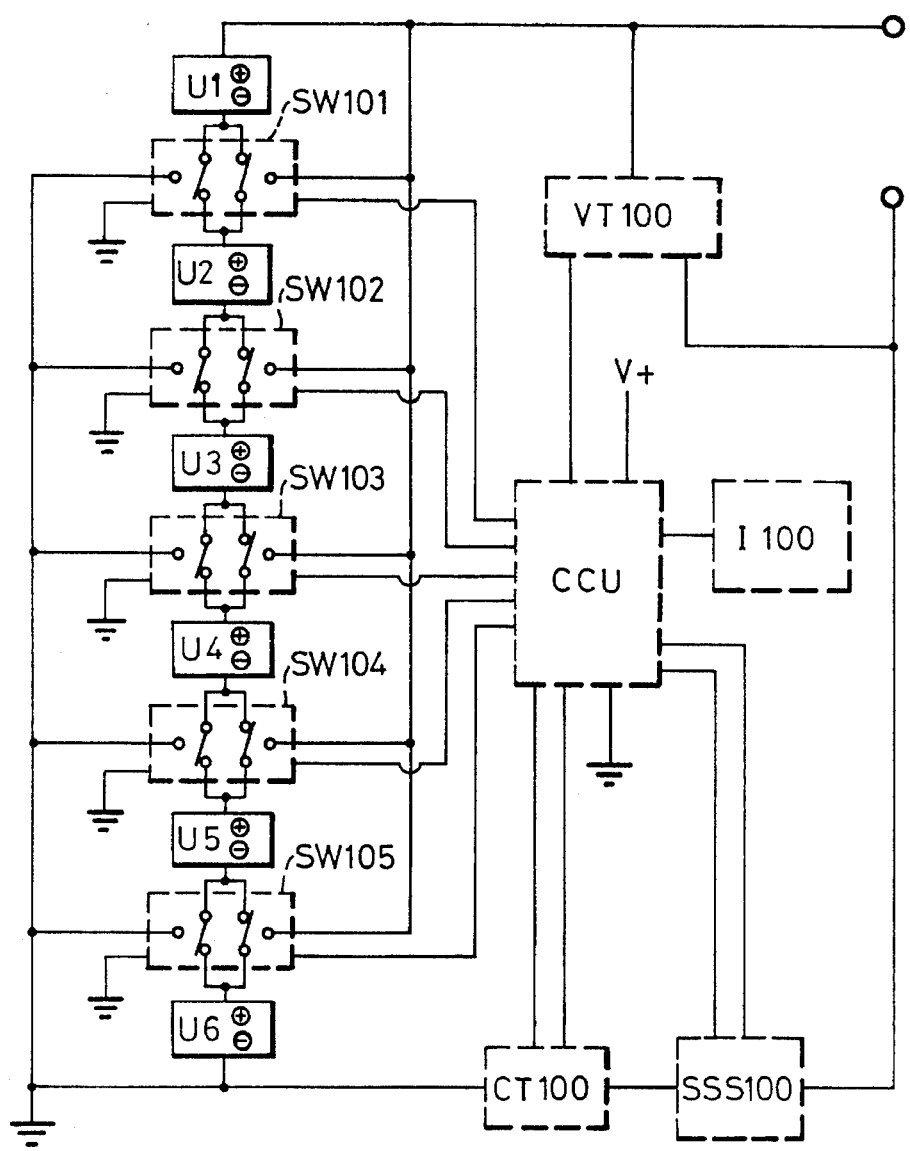
FIG. 4 is a view of a power unit shown in FIG. 1 which does not employ diodes.

In practical application, if power capacity is lower, diodes can be omitted (as shown in FIG. 4).

Figure 5:
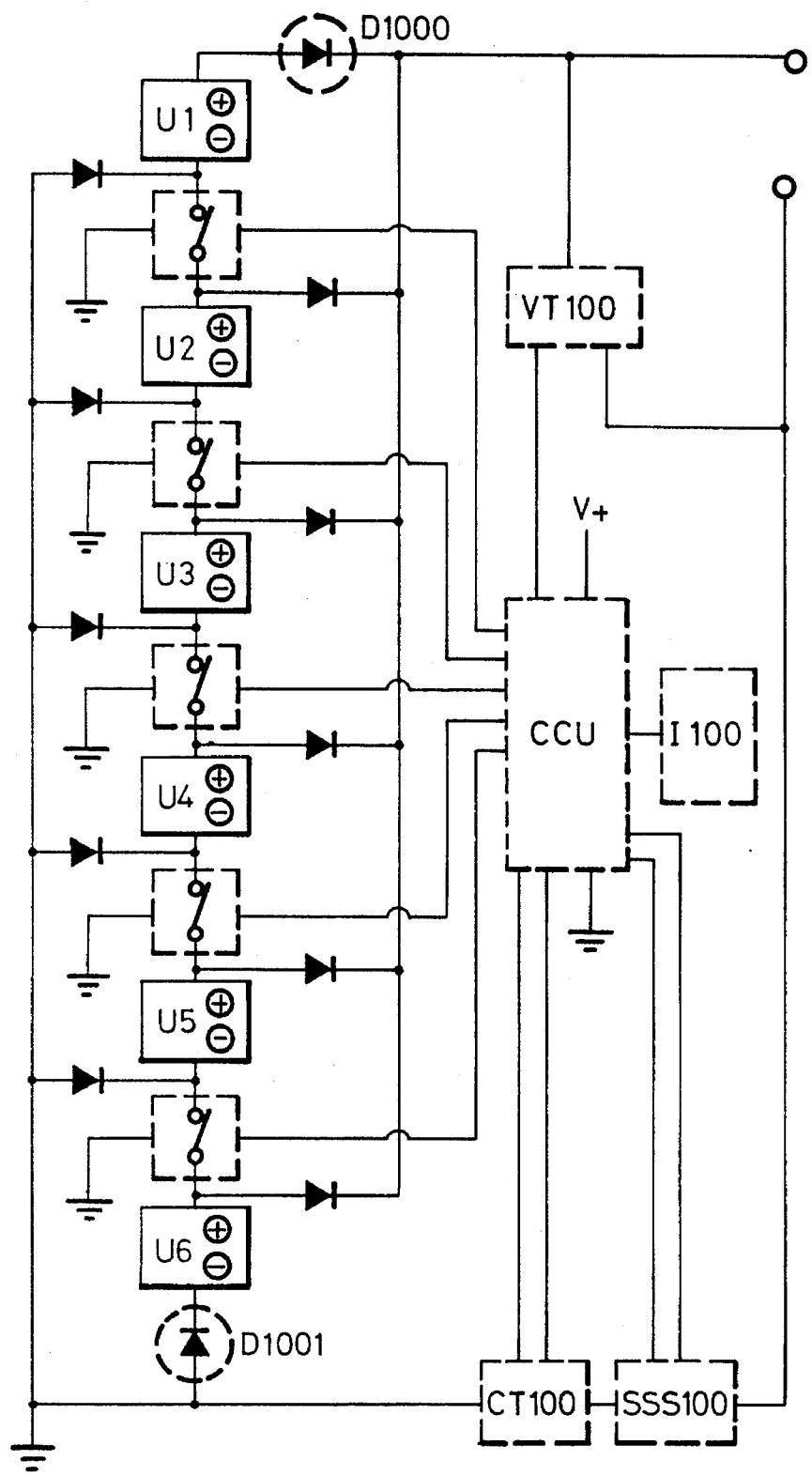
FIG. 5 is a view of a power unit shown in FIG. 1 which employs a plurality of single-pole switches.

In order to provide a desired efficiency and small size of the power unit, we can replace two-pole two-throw switches by single-pole single-throw switches. In FIG. 5, D1000 and D1001 are diodes for averaging voltage. They can be employed when needed.

Electro-mechanical switches between battery units can be replaced by solid state switches SSU101–SSU105 as shown in FIG. 6. In this power unit its switching function is the same as that of FIG. 5. In FIG. 6, D1000 and D1001 are diodes for averaging voltage, they can be employed when needed. We can further connect electro-mechanical switch contact on both sides of solid state switches SSU101–SSU105. It can reduce voltage drop, loss, and heat dissipation. The operation order of this power unit is as follows:

in "on" state, the (on) operation of the solid state switch is before the electro-mechanical switch;

in "off" state, the (off) operation of the solid state switch is after the electro-mechanical switch.

When solid state switch is used for linear control or PWM switch control, the electro-mechanical switch which is connected to it will not operate. Said solid state switch and the electro-mechanical switch can be controlled by CCU, or by means of manual electro-mechanical, or mechanical, or hydro-dynamical control.

By controlling the respective electro-mechanical switch, it is possible to obtain the output voltage to be higher tan the needed output value. Then the CCU controls drive current of each linear solid state switch member, and by means of control over the battery unit which has the highest voltage among all connected battery units, it provides the basic voltage (EB) to solid state switch member so as to obtain a linear output voltage (as shown in FIG. 7).

By controlling the respective electro-mechanical switches, it is possible to output the voltage higher that the needed output value. The CCU commands each solid state switch member to output chopped current, or the CCU controls drive current of each linear solid state switch member, or by controlling over the battery unit which has the highest potential among all battery units connected within the power unit, it provides averaging of the output voltage. For example, the CCU controls SSU 101, 102, 104, 105, which are all inter-connected; and SSU 103 is controlled by chopped wave, than the output voltage is as shown in FIG. 8. As it is seen, a ripple-wave value is lower than the ripple-wave value which can be obtained if the output voltage (as whole) is to be regulated.

The CCU can be periodically, reset in order to control the solid state switch member in order to correspond to different terminal voltage EB of each battery unit and to different required output values.

The solid state switch member SSS100 is connected to the power unit for continual adjustment between graded output voltages. That is, by means of linear adjustment or the PWM solid state switch member provides a low ripple output voltage which is slowly rising or slowly-dropping between two consequent levels of the graded output voltages (as shown in FIG. 7).

Another embodiment of said power unit (shown in FIG. 9) includes at least two sets of identical battery units (first set includes $U_1$ and $U_2$, second set includes $U_3$ and $U_4$) connected by two-pole switches, wherein the first pole includes one-throw pole.

Figure 9:
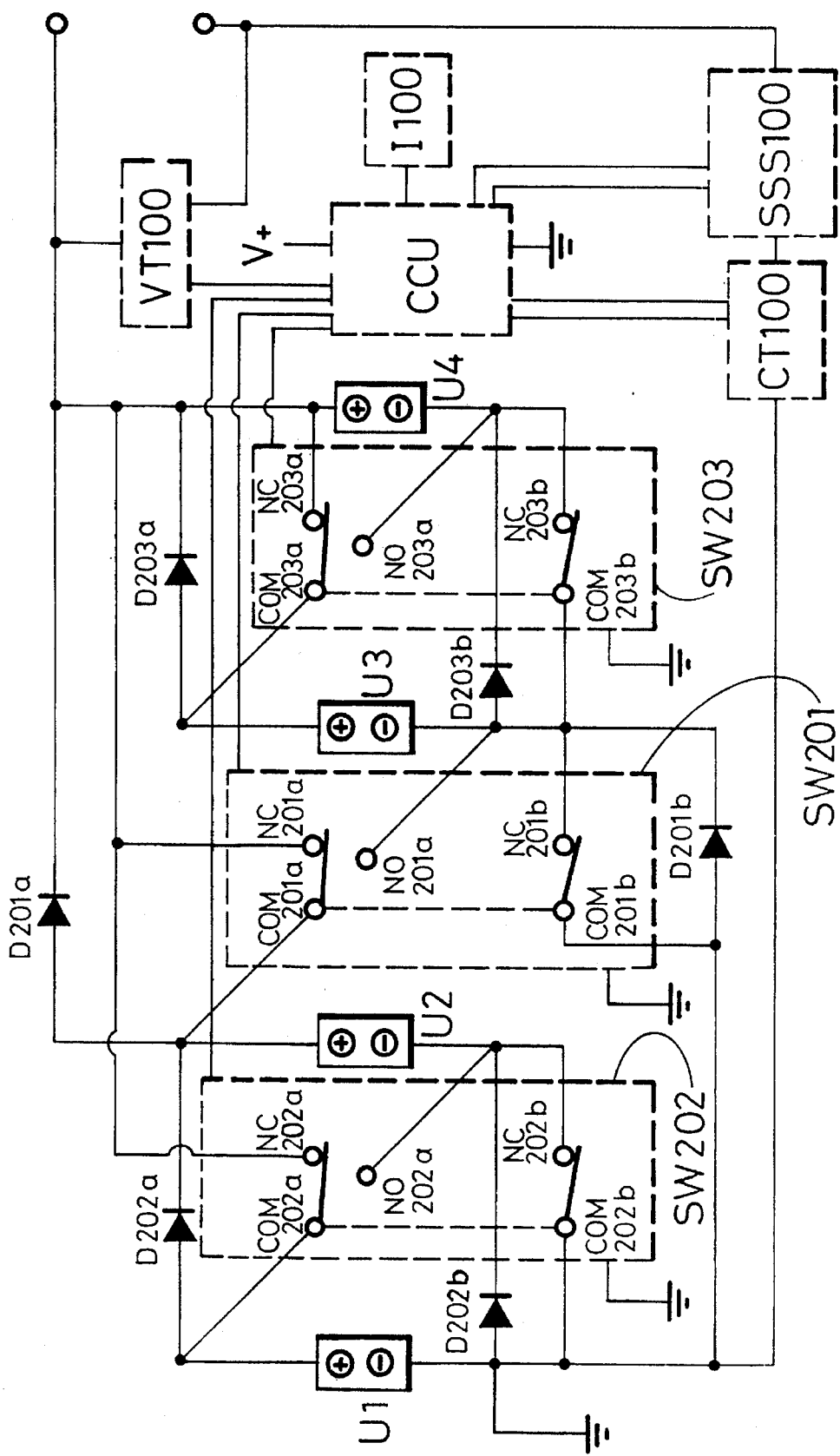
FIG. 9 is a view of another embodiment of a power unit of the present invention.
Figure 10:
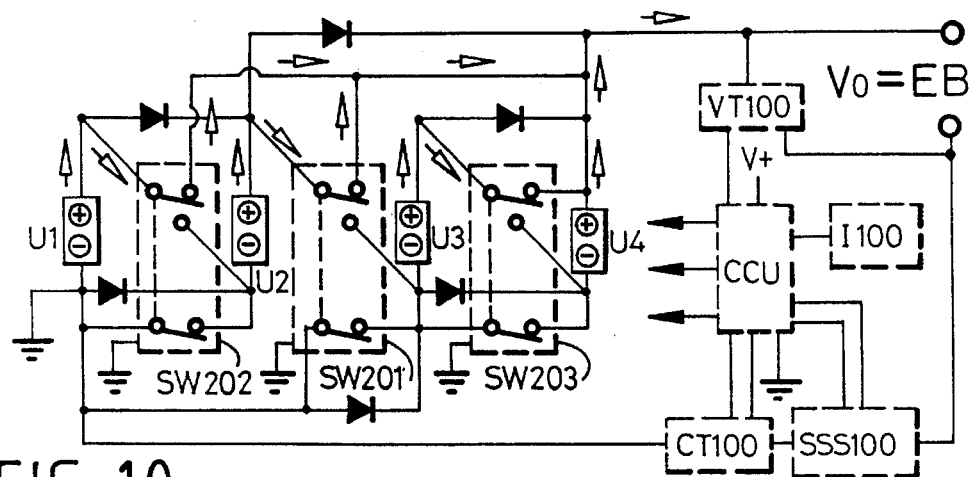
FIG. 10 is a view of low voltage power unit of FIG. 9 (the output voltage corresponds to a voltage of the battery unit).

According to the embodiment of FIG. 9 each switch (201, 202, 203) includes first and second common contacts (COM 201a, 201b–COM 203a, 203b), first and second normally closed contacts (NC201a, 201b–NC203a, 203B), and a normally opened contact (NO201a–NO203a). When respective switches (201–203) are actuated by the central controlling unit (CCU) the respective normally closed contacts (NC201a, 201b–NC203a, 203b) are opened, the respective first common contact (COM201a–203a) is connected to the respective normally opened contact (NO 201a–NO 023a).

Negative terminal of battery unit U1 is connected to output negative terminal and the common contact COM202b switch SW202 of and to the diode D202b. The positive terminal of the diode D202b is connected to the NO 202a of switch SW202 and to the NC 202b.

Negative terminal of the battery unit U1 is also connected to the common contact COM201b of switch SW201, and to the diode D201b. The output positive terminal of diode D201b is connected to the NC201b of SW201 and to the NO201a and to the common COM203b of the switch SW203 and to the negative pole of battery unit U3; and then directly to the diode D203b. The output positive terminal of the diode D203b is connected to the NC203b of the switch SW203 and to the negative pole of the battery unit U4.

The positive terminal of battery U3 is connected with the common contact COM203a of the switch SW203, and to the diode D203a. The output positive terminal of the diode D203a is connected with the NC203a of the switch SW203 and the positive terminal of the battery unit U4.

The NC202a of the switch SW202 and the NC201a of the switch SW201 are connected to output positive terminal.

Said power unit has the following characteristics:

1. When SW201, SW202, SW203 are not activated, the battery unit (U1–U4) tends to output a low voltage. Vo equals to 1×battery unit voltage (EB), as shown in FIB>10.

Figure 11:
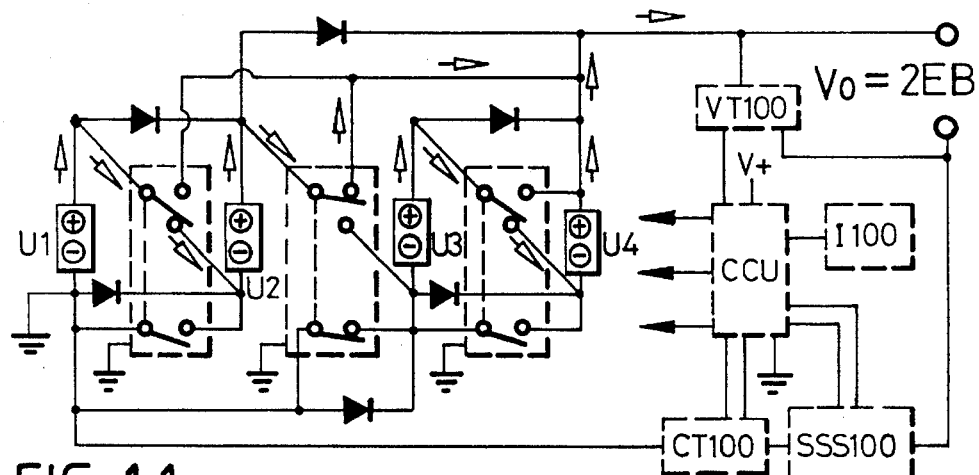
FIG. 11 is a view of intermediate voltage power unit of FIG. 9 (the output voltage corresponds to two voltages of the battery unit).

2. When SW202, SW 203 are activated, battery unit U1 is connected with U2, U3 serializes with U4, and then these two are multiplied to output voltage Vo=2 EB as shown in FIG. 11.

Figure 12:
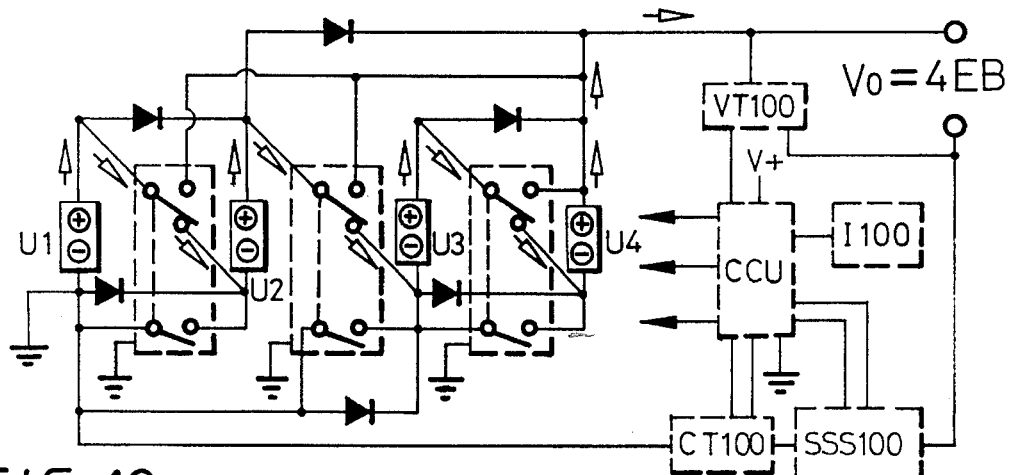
FIG. 12 is a view of high voltage power unit of FIG. 9 (the output voltage corresponds to four voltages of the battery unit).

3. When SW201, SW202, Sw203 are activated, battery unit U1–U4 are serialized so as to output voltage Vo=4 EB as shown in FIG. 12. The power unit of the embodiments shown in FIGS. 9–12 provide the same advantages as embodiments shown in previous FIGS. 1, 4–6. The functions of the main elements of the power unit are similar to their aforesaid.

Figure 13:
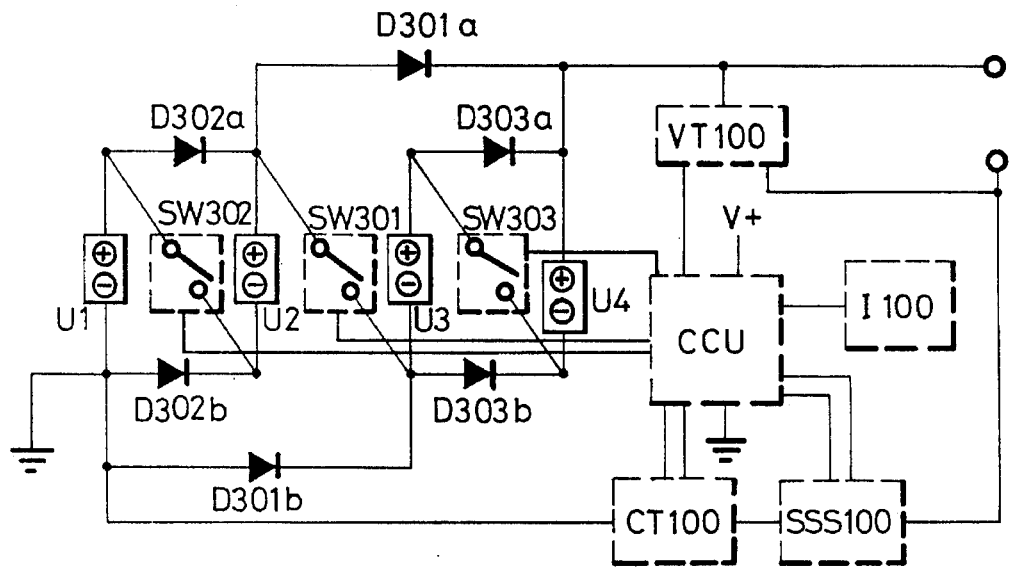
FIG. 13 is a view of power unit of FIG. 9, which employs single-throw switches combined with diodes.

FIG. 13 shows another embodiment of the power unit of the present invention similar to one shown in FIG. 9, but employing single-throw switches combining with diodes.

Except that the switches (SW301–SW303) can not eliminate the direct drop voltage of diodes, all other functions are also the same as in the power unit shown in FIG. 9.

Figure 14:
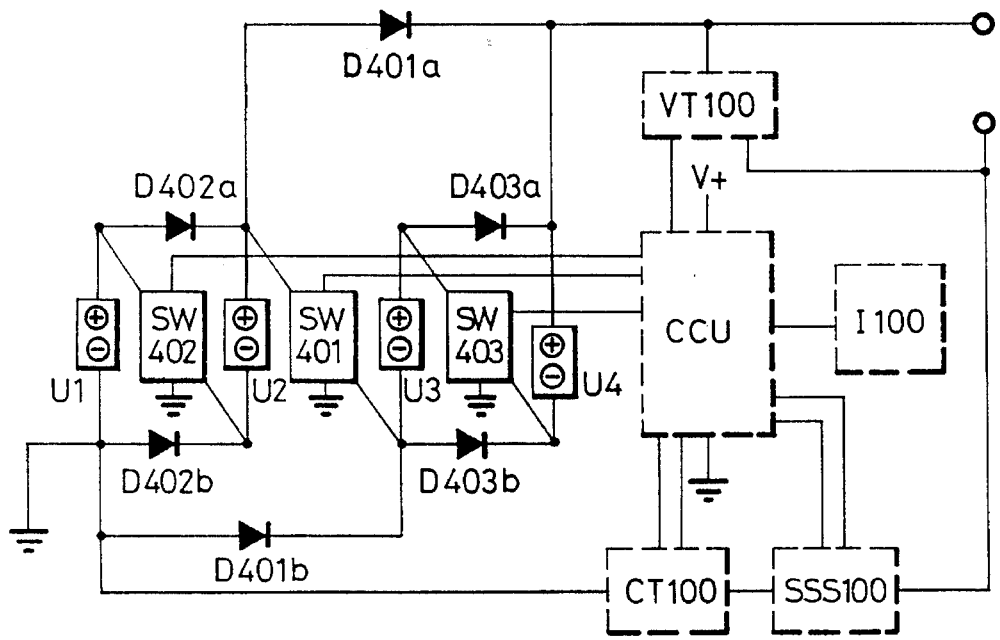
FIG. 14 is a view of power unit of FIG. 9, which employs solid state switches.

We can further use linear and switching solid state switches SW401, SW402, SW403, to replace said switch SW301, SW302, SW303 (as shown in FIG. 14).

Referring to FIG. 14, a power unit including solid state switches (SW401–SW403). Connection and function of diodes D401a, D401b, D402a, D402b, D403a, D403b are the same as those in the power units shown in FIGS. 9–13. The solid state switch member SSS100 provides the same functions of a continual adjustment between graded output voltages by linear and chopped wave control.

Figure 15:
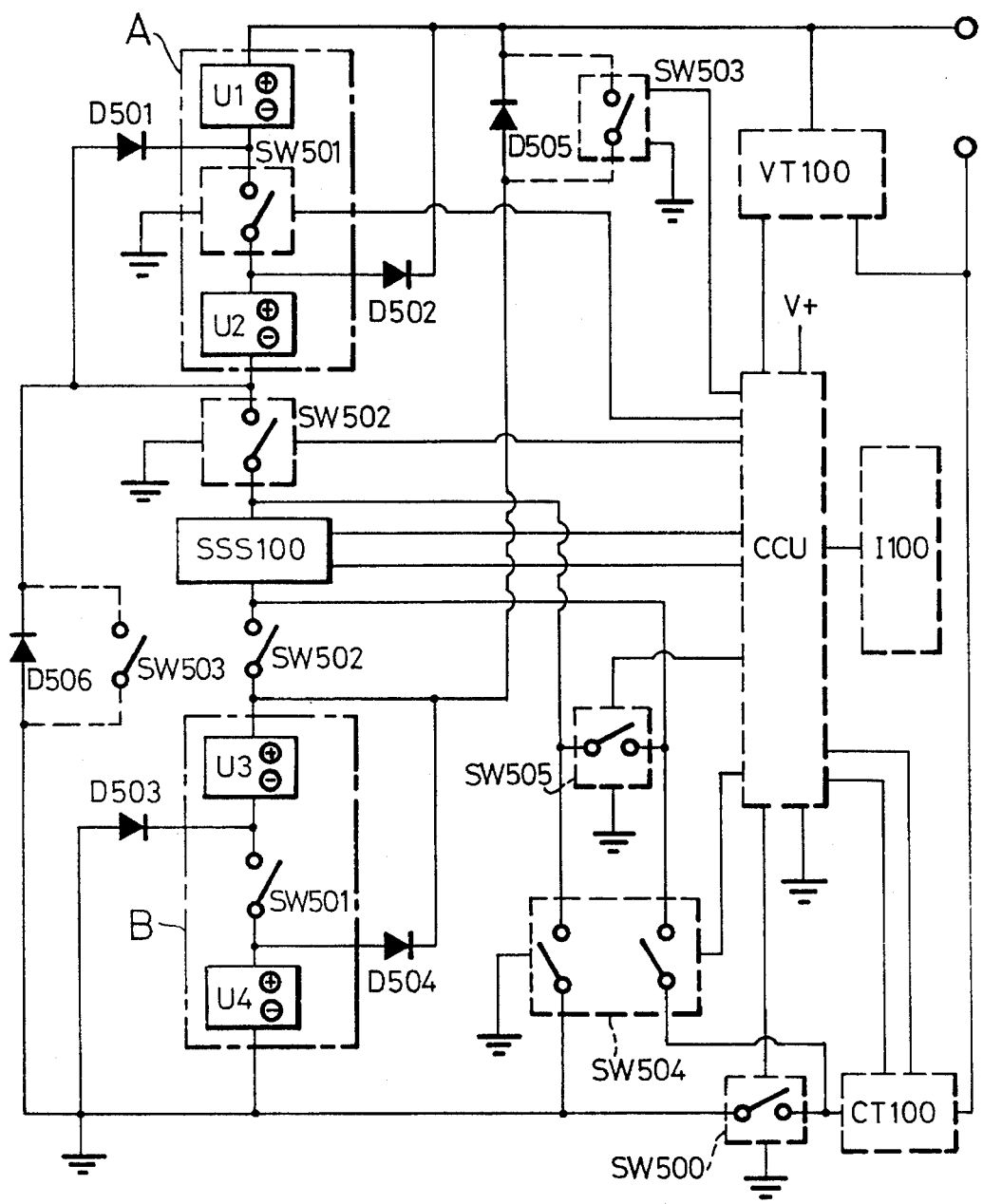
FIG. 15 is another embodiment of a power unit of the present invention, which employs two switches to control a solid state switch member.

Yet another embodiment of the power unit of the present invention is shown in FIG. 15, wherein the solid state switch member SSS100 for linear or chopped wave control of the graded output voltage is connected between two sets of (A and B) of battery units ($U_1$–$U_4$).

Normally opened control switches SW501, SW502 connect respective battery units with SSS100. The control switches SW501, SW502 can be actuated synchronously or not synchronously.

Figure 17:
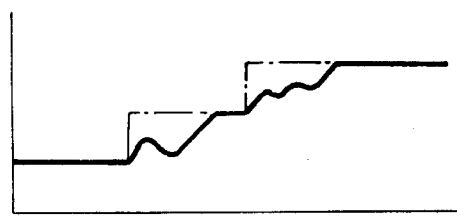
FIG. 17 is a timing diagram of linearized output voltage of the power unit shown in FIG. 15.
Figure 18:
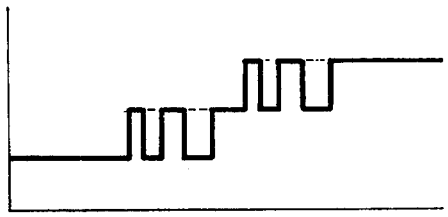
FIG. 18 is a timing diagram of chopped output voltage of the power unit of FIG. 15.

When all battery units $U_1$–$U_4$ tend to be connected in parallel, the solid state switch member is turned on or off to provide replacement of output switch SW 500 and to control and adjust output current for linear or chopped wave voltage. If linear or chopped wave adjustment functions of output graded voltage do not involve all battery units, and tend to be connected in series, (its output will be as illustrated in FIGS. 17 and 18), then said on-off switch SW502 can make different choice.

Auxiliary switch SW 505 is connected to the solid state switch member SSS100. When the solid state switch member SSS100 is in conducting state, the auxiliary switch SW505 will close to eliminate voltage drop and thermal loss. This switch is devised for diverse choice.

CCU unit, input control, voltage and current inspection device can be used to control said battery units, switches, and solid state switch member.

As shown in FIG. 15, control switches SW502 are employed to provide a control over solid state switch member, SSS100, which provides a linear and chopped wave control between each graded output voltage. A and B sets of identical battery units U1–U4 are arranged as follows: [1]. U1, U4 are the series for EB output; [2]. U1, U2 tend to be connected in series and then paralleled with U3, U4 which are also connected in series for 2× EB output; [3]. U1–U4 are connected in series for 4×EB output.

The control switches SW501 are connected between a negative and a positive terminals at battery units ($U_1$–$U_2$, $U_3$–$U_4$). The control switches SW502 are connected between each set (A,B) and the central control unit SSS100. Current-conducting diodes D501,D506,D503, D504, D505 are connected as shown. Both ends of the diode D506, jD505 can be further connected to a switch set SW503 which will close when battery units are in parallel, so as to eliminate thermal loss of the diodes D505, D506. Two independent normally open end contact point sets of control switch SW504, are connected in parallel with SSS100, SW502, U3, SW501, U4; connected to both contact terminals of output switch SW500. The output switch SW500 is connected to an output terminal. It is used to additionally control operation of the power unit.

Figure 16:
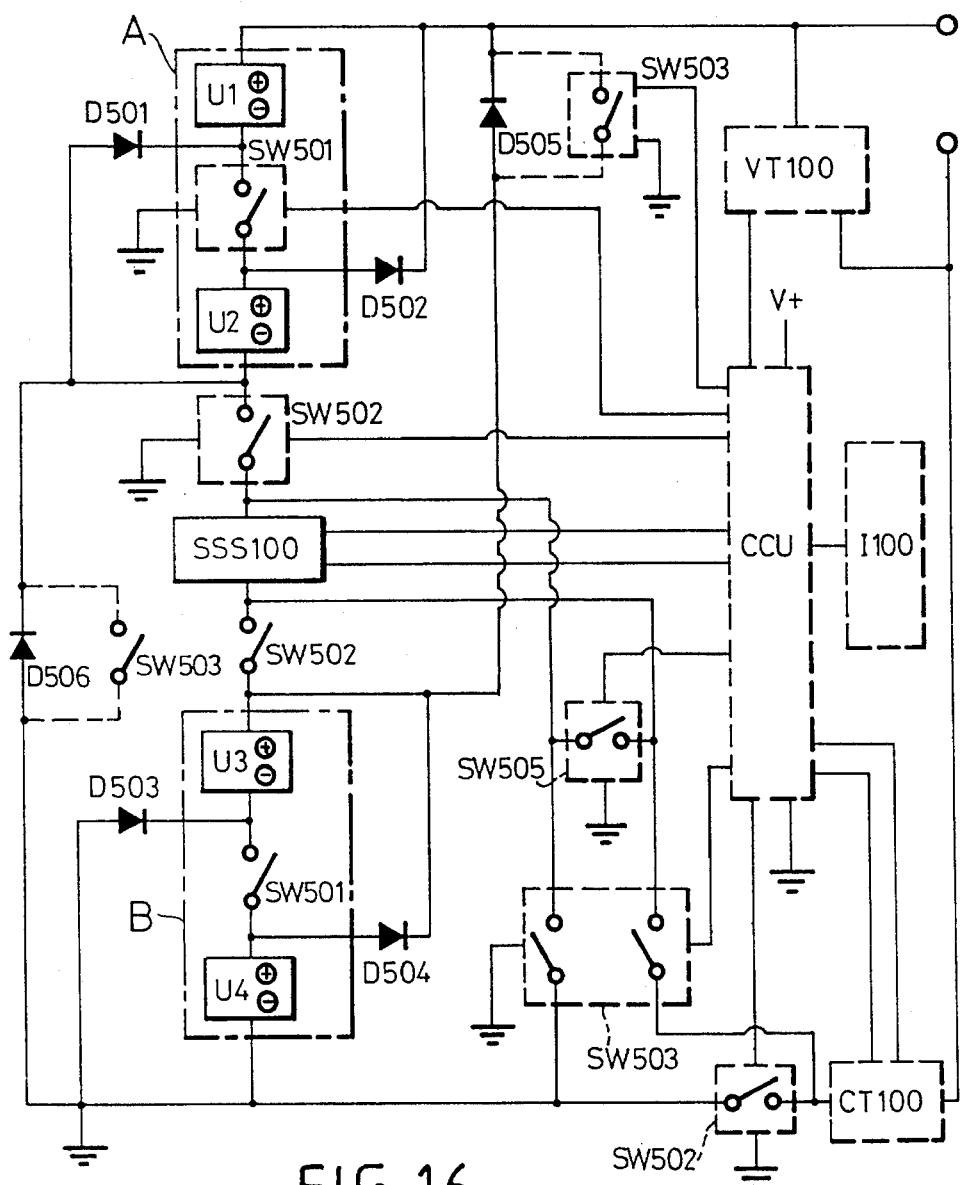
FIG. 16 is another embodiment of a power unit of FIG. 15.

Additional output switches SW500, SW503 and SW505 are introduced to the block-diagrams to provide additional control over the power unit. At the command of the CCU, SW500 tends to open its circuit, and solid state switch turns on and off the switch SW504 to make the solid state switch member SSS100 to initiate linear or chopped wave output for low graded voltage. The output switch SW500 can be further closed to eliminate the loss of voltage-drop, if this function is not needed, the output switch SW500 can be replaced by a set of normally opened contact point which is added from control switches SW502. The output switch 504 can be also replaced by two sets of independent normally opened contacts of this contact switch sets 503. (as shown in FIG. 16). Besides, if our auxiliary switch SW505 is connected to both contact terminals of SSS100, it can be provided to close contacts of the auxiliary switch SW505 when solid state switch member SSS100 is in conducting state in every gradient voltage range in order to eliminate pressure-drop and thermal loss.

The power unit of FIG. 15 provides the same functions and advantages as above—discussed embodiments.

Figure 19:
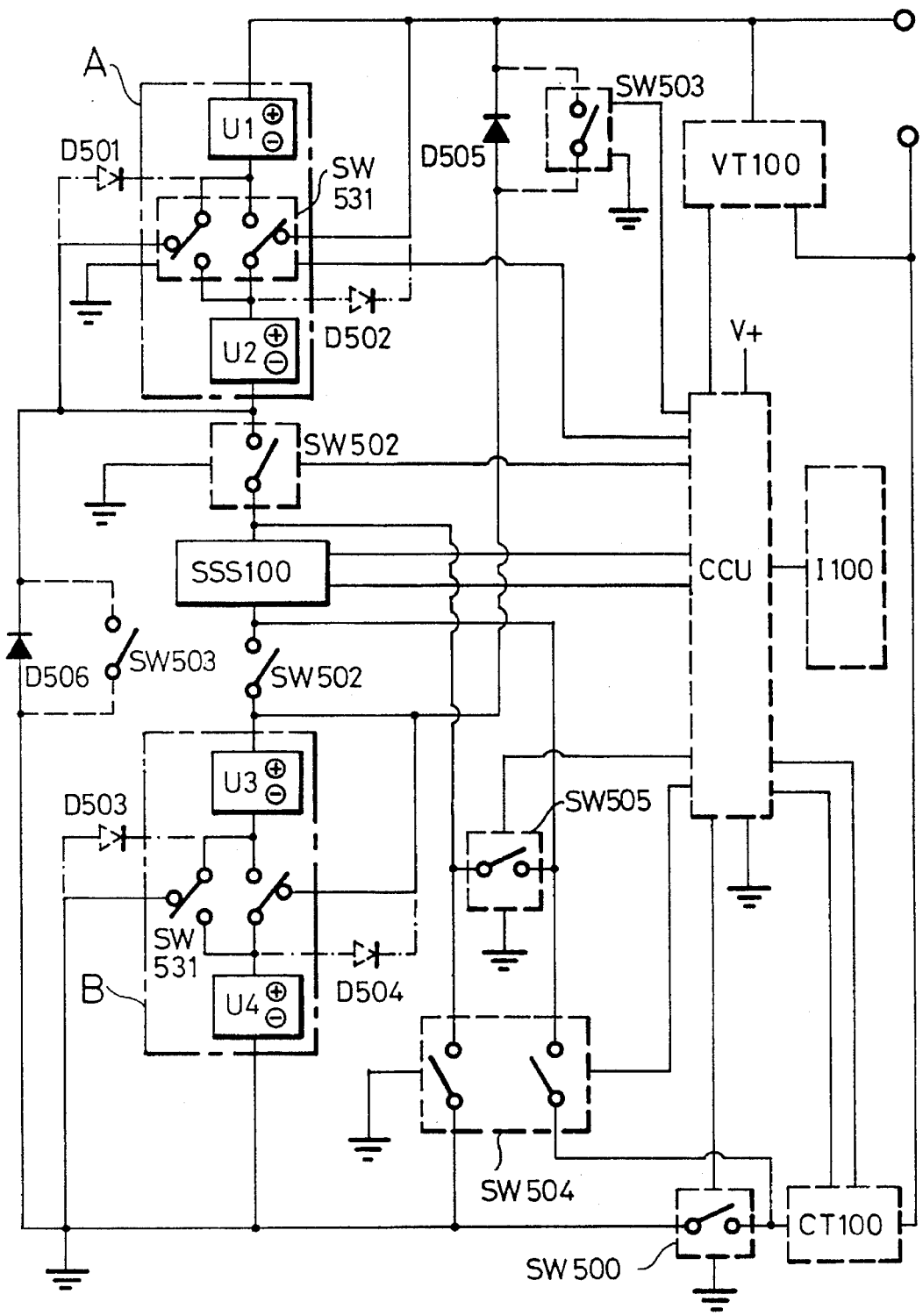
FIG. 19 is another embodiment of the power unit of FIG. 15, which employs two-pole two-throw switch.

FIG. 29 shows the states of each switch. As illustrated in FIG. 16, an embodiment of the invention in operation, at a high output current diodes will lose their power and will be heated, because of directional pressure-drop. In order to avoid the thermal loss and pressure-drop, initial control switch SW501 can be replaced by the same two-pole two-throw control switches SW531, as shown in FIG. 19. As shown in 20, if there is no requirement of output adjustment when low-voltage it output, SW500 is replaced by switch SW502, and SW 503 replaces Sw 504.

Figure 21:
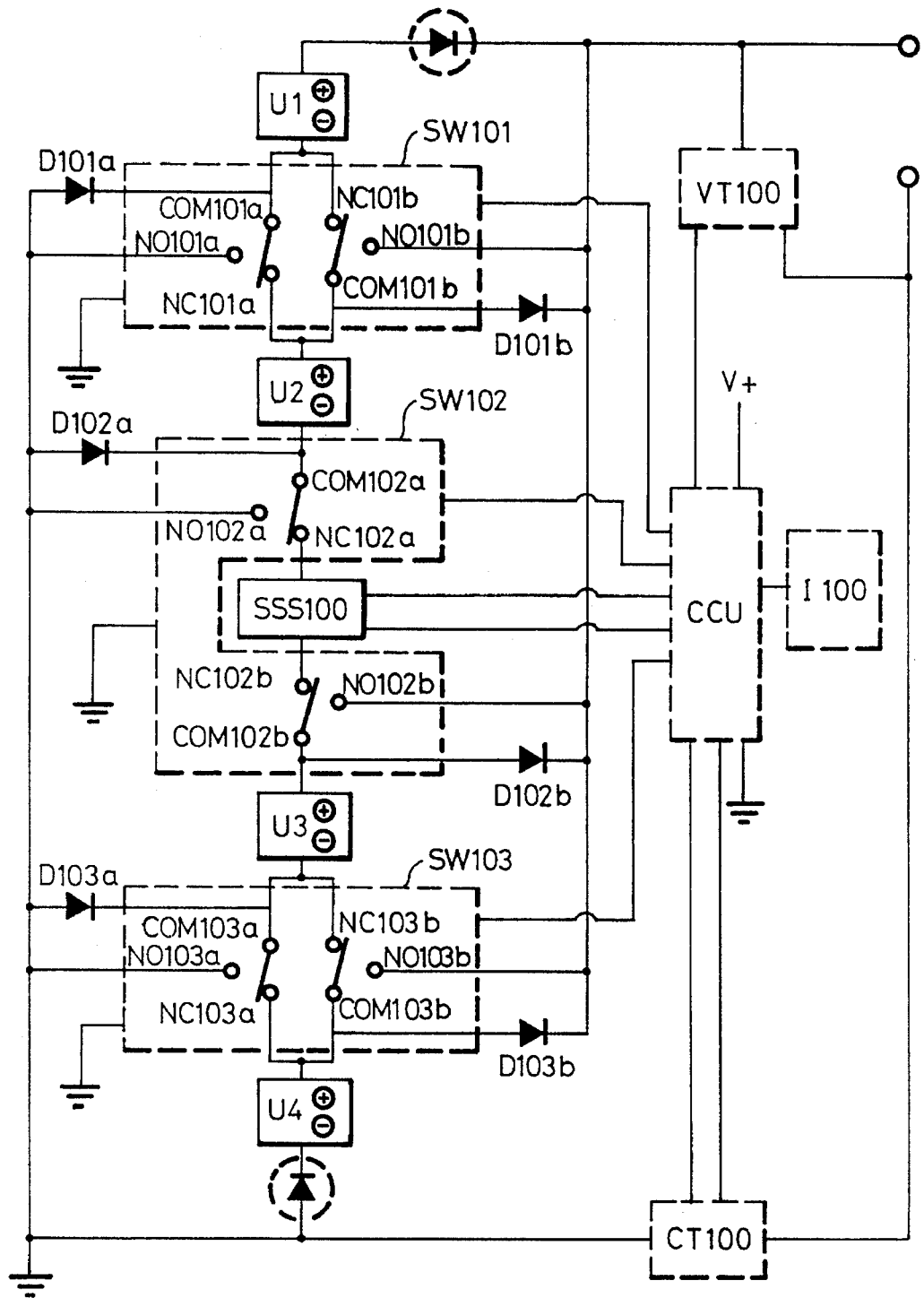
FIG. 21 is an embodiment of low-cost power unit according to the present invention, which has a linear or chopped wave adjustment function when it is beyond basic voltage.
Figure 22:
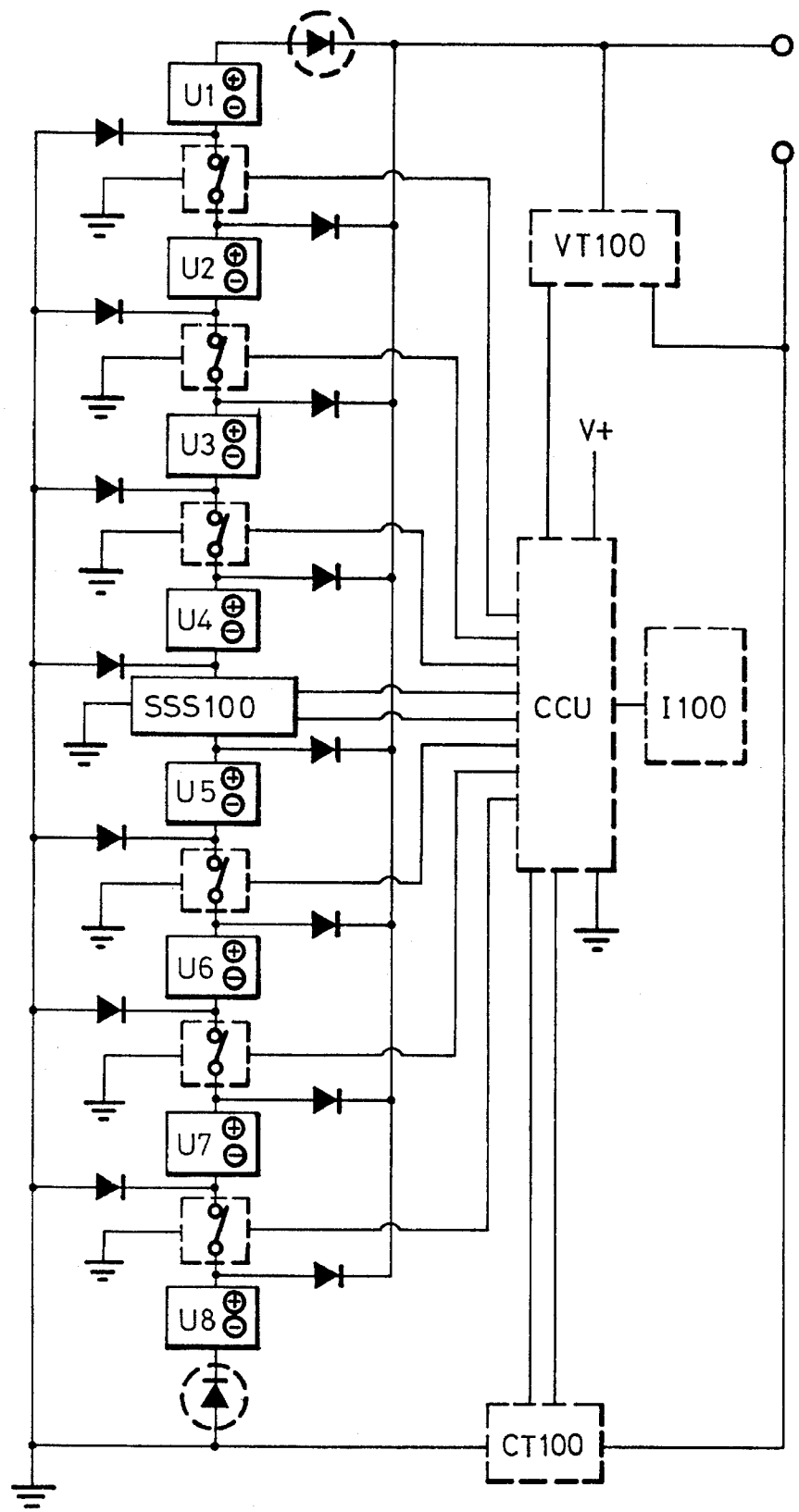
FIG. 22 is another embodiment of low cost power unit which has a linear or chopped wave adjustment function when it is beyond basic voltage.
Figure 23:
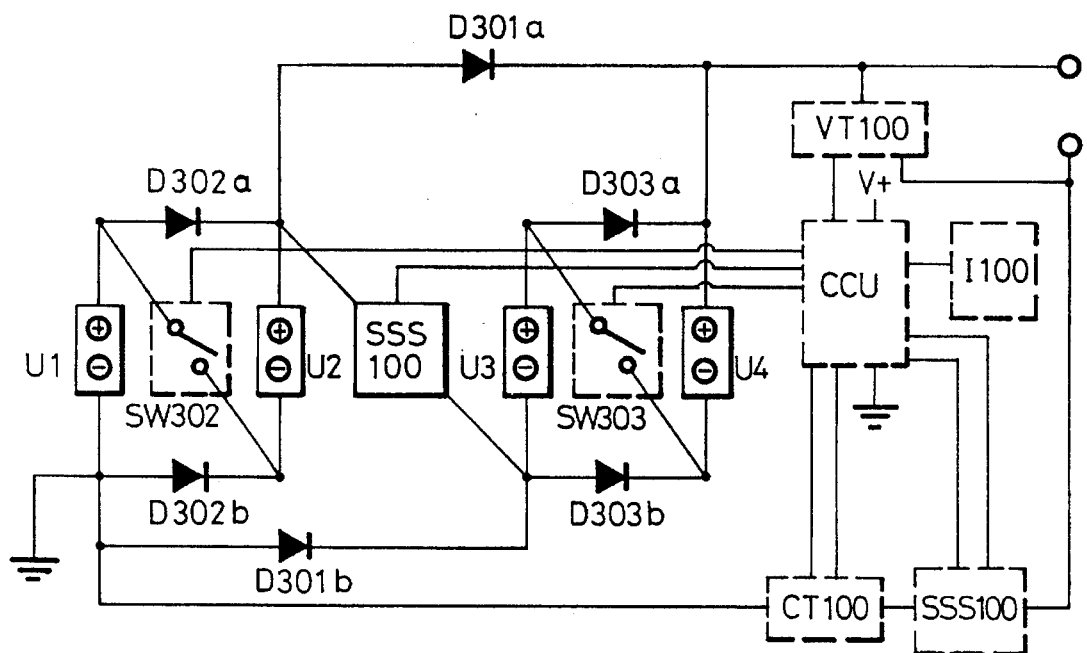
FIG. 23 is yet another embodiment of low-cost power unit which has a linear or chopped wave adjustment function when it is beyond basic voltage.

Besides, as far as cost is a concern, a low-cost power units are shown in FIGS. 21–23.

Figure 20:
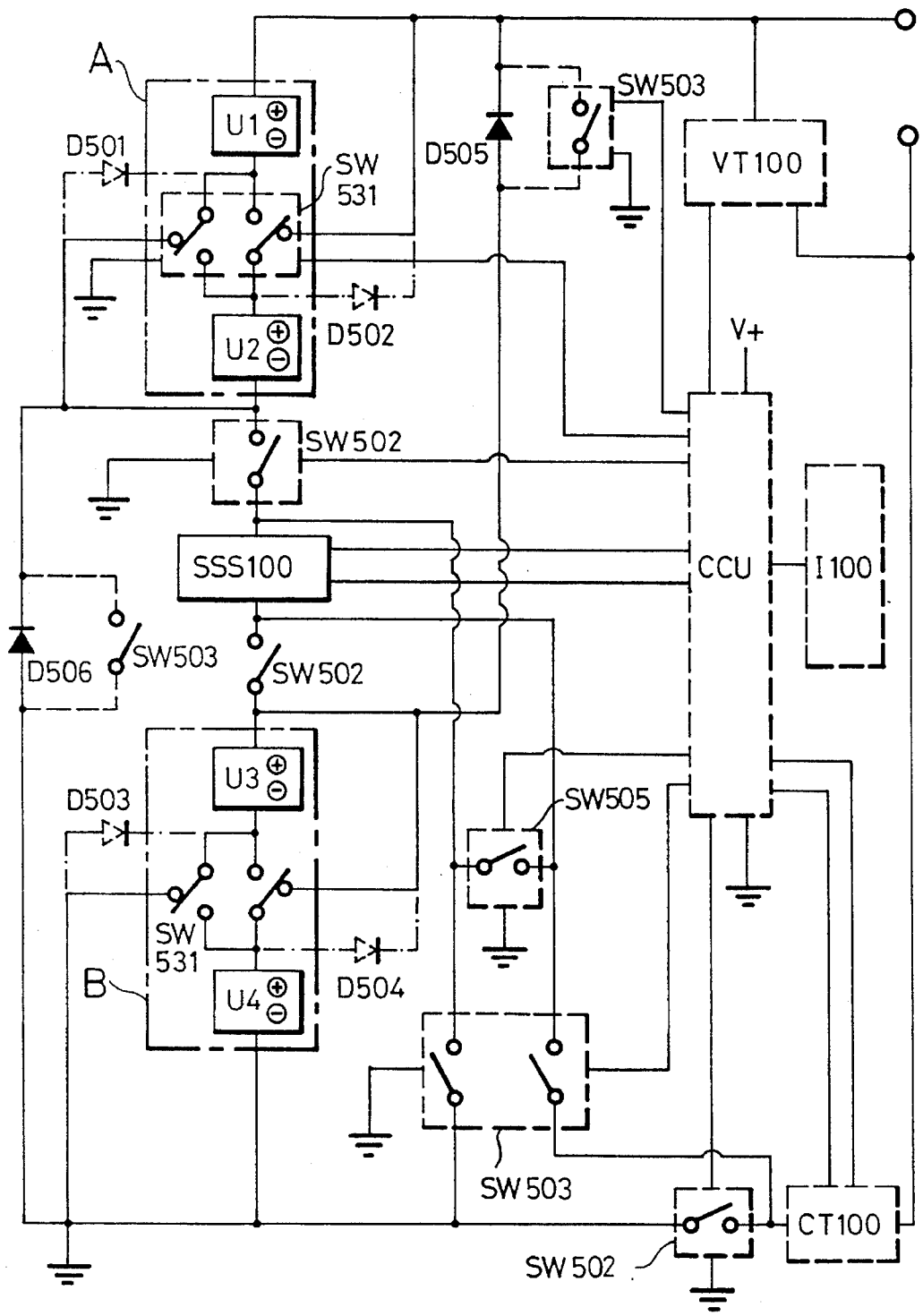
FIG. 20 is yet another embodiment of the power unit of FIG. 19, which employs additional contacts of control switches.

As shown in FIG. 21, which is based on FIG. 20, two-pole two-throw switch replaces SW 502 in FIG>20, and omit; SW 503. Two terminals of the solid state switch member SSS100 are connected to synchronous switches SW102 which are connected to the respective section of battery units.

As shown in FIG. 22, another embodiment of the low-cost power unit (on the basis of the power unit shown in FIG. 5), the solid state switch member SSS100 for the adjustment of linear or chopped voltage is connected between respective battery units $U_4$–U5.

FIG. 23 shows another embodiment of the power unit shown in FIG. 13, except that the switch SW301 in FIG. 13 is replaced by solid state switch member SSS100.

Figure 24:
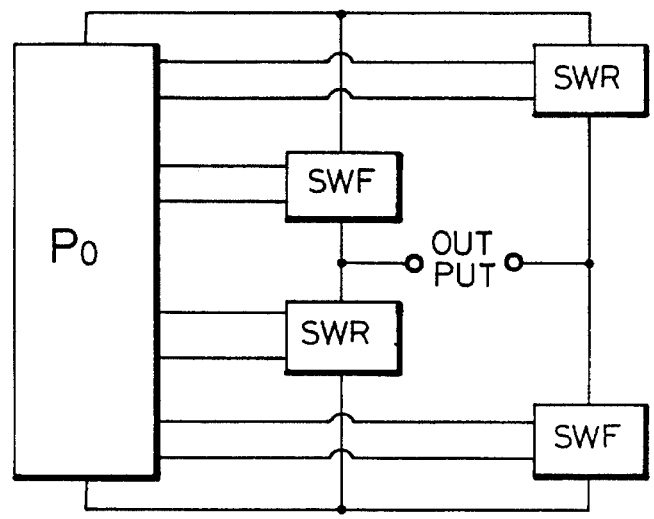
FIG. 24 is a schematic block-diagram of a power unit of the present invention which includes means for converting DC output to AC output.

In practical application, the power unit of the present invention can be combined with a bridge switch member of conventional and supply the AC output voltage. Less costly and more high-efficient design is proposed herein in order to convert DC output to AC output. As shown in FIG. 24, four sets of bridge connected liquid crystals (or electro-mechanical switch members) have output terminals power unit and input ends which is connected to a Po of the present invention. The bridge switch ember is controlled by CCU so that when its two switch ember sets SWF are in ON position, therein currents flow through a load connected to the output terminals and when another two switch member sets SWR are in On position, their currents are reversely flow through the load, that results in a periodical exchange.

Each conducting current period includes multi-voltage power supply turning from zero to low, and from low to high, and then from high to low and then from low to zero. The circle mentioned above is repeated and gains a DC output of approximate sine.

Figure 25:
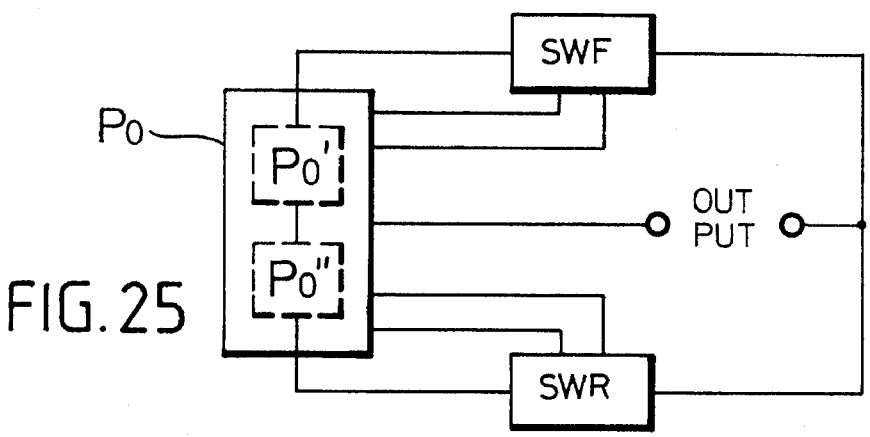
FIG. 25 is a schematic block-diagram of a power unit of the present invention, which includes two power units of the present invention with a DC output, and further includes means for converting DC output into AC output.

Said circuit can be formed into a bridge circuit (as shown in FIG. 25) by connecting a plurality of power units ($P_o'$, $P_o''$) and by connecting two sets of switch members.

The power unit Po composed of Po' and Po", supplies the output voltage to the load via a contact point. It will be appreciated by these skilled in the art that Po includes means for supply the output voltage of each Po' and Po" to the contact point of the power unit Po. Said bridge switch member can be formed by two sets (SWF, SWR). One set (SWF) is connected to the positive terminal of power unit while the other set (SWR) is connected to the negative terminal of Po. The other terminals of the two switch members (SWF, SWP) are connected together to the other terminal of the load.

Figure 26:
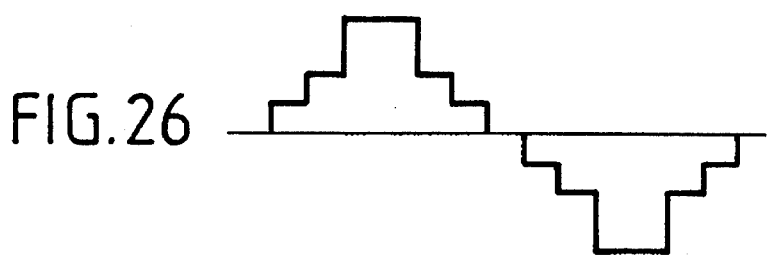
FIG. 26 is a timing diagram of output voltage of power unit of FIG. 25.

The timing diagram of the output is shown in FIG. 26.

Said circuits can include a single-unit, single-phase, or multi-unit multi-phase embodiments.

Besides, according to the need of the load, power wave forms includes triangular, rectangular, recessive, calculus, integral wave form. We may directly output DC pulse by controlling over the wave form that is needed for conversion at the output voltage by means of CCU, or by synchronously operated bridge circuit.

Again, power units of this system can supply and store power, sot that a two-phase conducting element can be used to provide a control over power units, and to adjust solid state switch element.

Said circuit can be further transformed into DC to DC converter. It can also perform a dynamic feed back function to rearrange its series-parallel connection so as to accept different voltage inputs and different voltage outputs respectively. It includes the following forms:

1. low-voltage input, high voltage output.

2. high-voltage input, low voltage output.

3. same voltage input, same voltage output.

4. long time small current input, short time large current output.

5. short time large current input, long time small current output.

6. power unit is structured by battery or capacity for mutual DC input-output operation.

7. initiate AC output by fitting DC input to bridge switch circuit.

Figure 27:
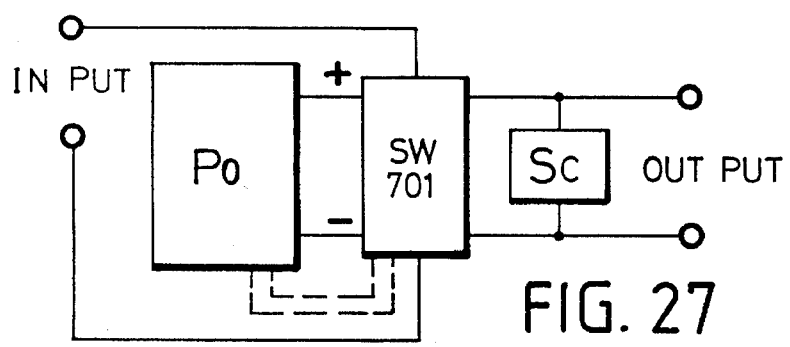
FIG. 27 is an embodiment of power unit of the present invention which has a two-phase contact off-on switch and additional output storage member.

As shown in FIG. 27, its main structure is as follows:

power unit Po, which can initiate multi-voltage control output by means of two-phase series-parallel switches. Two-phase distribution control switch SW701 may include electro-mechanical or solid state switch to accept the control from CCU and to provide selection of connecting with power unit for the output of multi-voltage or for dynamic feed back from output terminal and when needed initiates connection between input terminal and output terminal.

Figure 28:
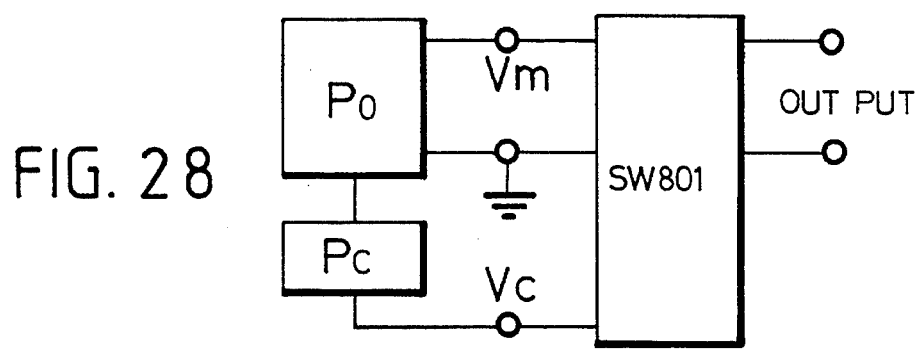
FIG. 28 is a schematic block-diagram of a power unit which includes an auxiliary power unit.

If the output is a DC output, it can be viewed as if it needs to connect auxiliary stroge battery, such as SC storage battery, capacitor, etc.; if the output is an AC output, it needs to connect parallel LC resonant storage device of electric inductance and capacity. Another embodiment is shown in FIG. 28.

A main power unit Po control interface has a positive output terminal Vm and a negative terminal which is ground; our auxiliary power unit PC is connected to the Po, another output terminals is a VC (Vm) which is combined with said main power unit Po to form an output connected to distribution control switch SW801. The distribution control switch SW801 can switch output terminals to be either multi-voltage Vm+Vc or multi-voltage Vm, or single VC.

If said VC needs to be combined with other load, it can be selected to enlarge its capacity according to its need.

Said circuit may accept any wave shape DC input, and may output needed wave shape by means of control output on-off switch.

The control process of said application forms said switching function by means of CCU to control power unit to combine series-parallel switch member. We may device a DC to DC convertor, a DC UPS of different input-output voltage or DC to AC UPS, or charger, electro-chemical equipment, electric soldering machine, and other DC power suppliers.

To illustrate the function of this circuit, the following example is given. If 12 sets of 12 V of storage battery can form the circuit shown in FIG. 22 and an auxiliary battery is added to it, then its initial output is:

1. 12 sets output 12 V 2. every 6 sets are in parallel and then in series and the output is 24 V, 3. every 4 sets are paralleled and then connected in series and the output is 36 V, 4. every 3 sets multiplied and then serialized and the output is 48 V, 5. every 2 sets multiplied and then serialized and the output is 72 V, 6. every sets multiplied and then serialized and the output is 144 V.

When the auxiliary battery is added on it, to increases potential grades, such a 6 V, 18 V, 30 V, 42 V, 54 V, 78 V, 150 V.

In practical uses, we select voltage of auxiliary power unit according to our need.

In conclusion, object of the present invention is to provide an effective unique power unit which can output graded output-voltage. Said power units is further combined with linear of chopped solid state switch member so as to achieve a non-sparkle multi-voltage switching and low ripple-wave PWM voltage output of graded linear or chopped wave and further feedback the limited current or set voltage output adjustment function.

What is claimed is:

1. A power unit with a controlled output voltage, comprising:

a first, a second, a third and a fourth substantially identical battery units, each said battery unit having a positive and a negative pole, a first, a second, a third, and a fourth electro-mechanical normally opened control switches, a first and a second electro-mechanical normally opened output switches, a first, a second and a third normally opened electro-mechanical auxiliary switches, a solid-state switch having a first, a second, a third and a fourth terminals, a first, a second, a third, a fourth, a fifth and a sixth diodes, each having a positive and a negative terminal, a pair of output terminals, including a positive output terminal and a negative output terminal, wherein the first control switch is connected between the negative pole of the first battery unit and the positive pole of the second battery unit, wherein the second control switch is connected between the negative pole of the second battery unit and the first terminal of the solid-state switch, wherein the third control switch is connected between the positive pole of the third battery unit and the second terminal of the solid-state switch, wherein the fourth control switch is connected between the negative pole of the third battery unit and the positive pole of the fourth battery unit, wherein the positive terminal of the first diode is connected to the negative pole of the first battery unit, wherein the negative terminal of the second diode is connected to the positive pole of the second battery unit, wherein the positive terminal of the third diode is connected to the negative pole of the third battery unit, wherein the negative terminal of the fourth diode is connected to the positive pole of the fourth battery unit, wherein the negative terminal of the first diode and the positive terminal of the sixth diode, respectively, are connected to the negative pole of the second battery unit, wherein the positive terminal of the second diode and the positive terminal of the fifth diode are connected to the positive output terminal, wherein the negative terminal of the third diode and the negative terminal of the sixth diode are connected to the ground, wherein the positive terminal of the fourth diode and the negative terminal of the fifth diode are connected to the positive pole of the third battery unit, wherein an electro-mechanical normally opened first auxiliary switch is connected in parallel between the first and the second terminals of the solid-state switch, wherein the first output switch is connected between the negative terminals of the third and the sixth diodes and the negative output terminals, wherein the second output switch is connected in parallel to the first auxiliary switch and in parallel to the first output switch, wherein the second auxiliary switch is connected in parallel to the sixth diode, wherein the third auxiliary switch is connected in parallel to the fifth diode, wherein the output voltage may have a zero step-value, a low step value, a middle step value, and a high step value, wherein a central control unit controls said control, output, auxiliary and solid-state switch such that:

while changing the output voltage from the zero step level to the low step level and from the low step level to the zero step level, the solid-state switch, the second auxiliary switch, the third auxiliary switch, and the second output switch being switched on; the first output switch, and said control switches being switched off;

when the output voltage has the low step level, the first output switch, the second auxiliary switch and the third auxiliary switch being switched "ON";

while changing the output voltage from the low step level to the middle step level and from the middle step level to the low step level, the solid-state switch, the first output switch, the second and the third control switches being switched "ON"; the first and the fourth control switches, the first, second and the third auxiliary switches and the second output switch being switched "OFF";

when the output voltage has the middle step level, the first output switch, the second and the third control switches, and the first auxiliary switch being switched "ON"; and the first and the fourth control switches, the second and the third auxiliary switches, and the second output switch being switched "OFF";

while changing the output voltage from the middle step level to the high step level and from the high step level to the middle step level, the solid-state switch, the first output switch, the control switches being switched "ON"; and the second output switch and the auxiliary switches being switched "OFF"; and when the output voltage has the high step level, the first output switch, control switches, and the first auxiliary switch being switched "ON"; and the second output switch, the second and the third auxiliary switches being switched "OFF";

wherein the solid-state switch provides a linear and a chopped wave control for the output voltage between said step values of the output voltage, thereby smoothing the output voltage, such that the solid-state switch being switched "ON" while the output voltage being changed from the zero step level to the low step level, from low step level to the middle step level, from the middle step level to the high step level, from the high step level to the middle step level, from the middle step level to the low step level and from the low step level to the zero step level.

* * * * *